(12) United States Patent
Branch et al.

(10) Patent No.: US 6,485,322 B1
(45) Date of Patent: Nov. 26, 2002

(54) REMOVABLE LATCH AND BEZEL EMI GROUNDING FEATURE FOR FIBER-OPTIC TRANSCEIVERS

(75) Inventors: Scott Michael Branch, Rochester, MN (US); David Peter Gaio, Rochester, MN (US); William K. Hogan, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/410,786

(22) Filed: Oct. 1, 1999

(51) Int. Cl.[7] .............................................. H01R 13/62
(52) U.S. Cl. ..................... 439/357; 439/76.1; 439/923; 439/939
(58) Field of Search ............................... 439/357, 358, 439/92, 95, 101, 108, 76.1, 328, 939, 923

(56) References Cited

U.S. PATENT DOCUMENTS

| | | | |
|---|---|---|---|
| 3,149,897 A | * 9/1964 | Martineck | |
| 4,087,151 A | * 5/1978 | Robert et al. | |
| 4,109,989 A | * 8/1978 | Snyder, Jr. et al. | |
| 4,678,121 A | * 7/1987 | Douty et al. | 439/610 |
| 4,690,478 A | * 9/1987 | Rahrig et al. | 439/271 |
| 4,847,711 A | * 7/1989 | Inoue | 369/72 |
| 4,873,614 A | * 10/1989 | Lichtensperger | |
| 4,944,568 A | * 7/1990 | Danbach et al. | 439/246 |
| 5,112,251 A | * 5/1992 | Cesar | 439/607 |
| 5,352,133 A | * 10/1994 | Sampson | 439/357 |
| 5,475,548 A | * 12/1995 | Rudi et al. | 361/220 |
| 5,494,451 A | * 2/1996 | Bowers | 439/328 |
| 5,605,463 A | * 2/1997 | Mac Gregor et al. | 439/64 |
| 5,613,882 A | * 3/1997 | Hnatuck et al. | 439/686 |
| 5,659,459 A | * 8/1997 | Wakabayashi et al. | 361/753 |
| 5,713,752 A | * 2/1998 | Leong et al. | 439/423 |
| 5,800,198 A | * 9/1998 | Morlion | 439/372 |
| 5,828,804 A | * 10/1998 | Akins | 385/58 |
| 5,980,324 A | * 11/1999 | Berg et al. | 439/630 |
| 6,102,747 A | * 8/2000 | Paagman | 439/701 |
| 6,135,793 A | * 10/2000 | Babineau | 439/92 |
| 6,304,436 B1 | * 10/2001 | Branch et al. | 361/683 |

FOREIGN PATENT DOCUMENTS

JP 57-56476 * 12/1982

OTHER PUBLICATIONS

IBM Technical Disclosure, vol. 39, No. 11, p. 85, Nov. 1996.*

* cited by examiner

Primary Examiner—Neil Abrams
(74) Attorney, Agent, or Firm—Allen, Dyer, Doppelt, Milbrath & Gilchrist, P.A.

(57) ABSTRACT

An electrical connector system has two connectors, one of which is included in a module mateable with the other connector in a pluggable manner. The other connector includes an elongated guide rail and a connector block in which are retained two or more electrical contacts. The guide rail by use of snap projections and recesses (11) may extend through an opening in a computer enclosure. A latch member is attached to the end of the guide rail in a manner that releases the latch member from the guide rail if the latch member is bumped or jarred to minimize the likelihood of damaging it. A grounding strip embedded in the guide rail makes electrical contact with the bezel through which it extends to protect against EMI. The ground strip includes raised contact portions (41) that engage a conductive bottom cover (39) of the module (72) and lower contact portions (53) for surface mount to a system circuit board (26).

34 Claims, 8 Drawing Sheets

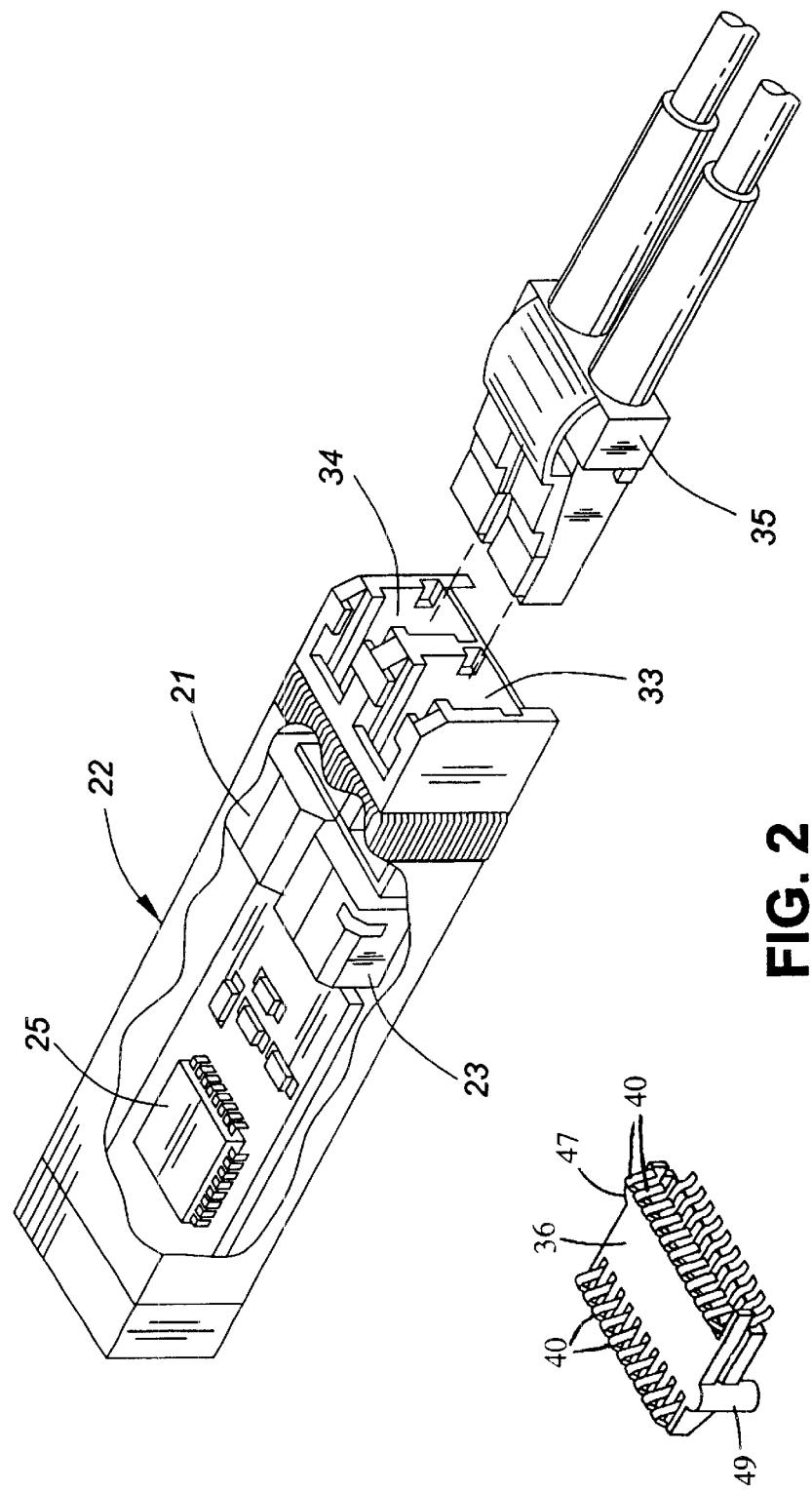

REMOVABLE LATCH AND BEZEL EMI GROUNDING FEATURE FOR FIBER-OPTIC TRANSCEIVERS

CROSS-REFERENCE TO RELATED APPLICATIONS

Application Ser. No. 09/391,974, filed Sep. 8, 1999, entitled "GUIDE RAIL AND CAM SYSTEM WITH INTEGRATED LOCK-DOWN AND KICK-OUT SPRING FOR SMT CONNECTOR FOR PLUGGABLE MODULES"; U.S. Pat. No. 6,074,228, issued Jun. 13, 2000 entitled "GUIDE RAIL AND CAM SYSTEM WITH INTEGRATED CONNECTOR FOR REMOVABLE TRANSCEIVER"; and U.S. Pat. No. 5,980,324, issued Nov. 9, 1999, entitled "GUIDE RAIL SYSTEM WITH INTEGRATED WEDGE CONNECTOR FOR REMOVABLE TRANSCEIVER"; are related and are incorporated herein in their entireties by this reference.

BACKGROUND OF THE INVENTION

1. Field of the Invention

The present invention relates generally to electronic connector systems and, more specifically, to low-profile connector systems for user-removable electronic modules, such as transceiver modules that interface with a computer.

2. Description of the Related Art

Electrical connectors are used to interconnect circuit cards and other electronic modules or assemblies in computers and other equipment. Various international and industry standards define the type of connectors used to interface computers to external communication devices such as modems, network interfaces, and other transceivers. A well-known type of transceiver developed by an industry consortium and known as a gigabit interface converter (GBIC) or serial optical converter (SOC) provides an interface between a computer and an Ethernet, Fibre Channel or other data communication environment. In co-pending U.S. patent application Ser. No. 09/216,014, a connector system is described that includes an optoelectronic transceiver module of this type that conforms to the Small Form Factor (SFF) standard. The SFF standard specifies a module enclosure 9.8 mm in height by 13.5 mm in width and allowing a minimum of 24 transceivers across a standard rack opening. The connector system includes a connector that is mountable on a circuit card of a computer and into which the transceiver module can be plugged. The connector has a guide rail and cam system that facilitates mechanical mating with the transceiver module. The connector can be mounted on a circuit card behind a bezel of the computer enclosure, with the guide rail extending through an opening in the bezel. The connector further has a connector block with an array of electrical contacts that facilitate electrical mating with complementary contacts of the transceiver module. A user mates the transceiver module with the connector by sliding the module over the end of the guide rail that protrudes through the bezel, and sliding it along the guide rail until the cam fully engages the transceiver module and full mechanical and electrical contact is established. At approximately the point at which the transceiver module becomes fully engaged with the connector, a latch member at the distal end of the guide rail engages a complementary latch member on the module.

Because the guide rail of the above-described connector system protrudes through the opening in the bezel, the latch member at its distal end is subject to being inadvertently bumped or jarred. If the force of such an impact is severe enough, it could damage the latch or guide rail or damage the integrity of the soldered electrical connections between the guide rail and the circuit board upon which it is mounted.

It would be desirable to minimize the likelihood of the above-described damage occurring. The present invention addresses this problem and others in the manner described below.

SUMMARY OF THE INVENTION

The present invention relates to an electrical connector system having two connectors in which one of the connectors is included in a module mateable with the other connector in a pluggable manner. The other connector is mountable on a circuit board and includes a body and two or more electrical contacts. In accordance with one aspect of the invention, the body of the mountable connector includes an elongated guide rail with a latch member at its distal end that snaps off if it experiences a jarring force to prevent damage. A snap engagement portion on the latch member mates with a mating snap engagement portion on the distal end of the guide rail. If the latch member snaps off, one can reattach it by snapping it back onto the guide rail. In accordance with another aspect of the invention, the guide rail includes an electrical contact at its distal end that is mateable with the bezel of a computer enclosure in which the connector may be mounted. The mountable connector can be mounted on a circuit board in the computer enclosure, with the guide rail extending through an opening in the bezel. The electrical contact between the bezel and the mountable connector can enhance EMI shielding for the signals carried by the connector system.

In an exemplary embodiment of the invention, the body of the mountable connector is definable by three mutually perpendicular axes and includes a connector block at the proximal end of the guide rail, which is elongated in the direction of the first axis. The connector block retains the contacts, which are spaced from one another in the direction of the first axis. The electrical contacts of the mounted connector may be arrayed in two or more rows, each parallel to the second axis and having two or more contacts. The body, including the connector block, has a very low profile, and in certain exemplary embodiments it is preferably less than about 10 mm in height, i.e., the dimension defined by the third axis, to accommodate the Small Form Factor standard and to facilitate surface-mounting the bottom of the body on the circuit board. The body also includes a cam that, in response to a force of the module being moved along the guide rail, redirects the force in a direction having a component along the third axis so as to cause relative motion and resulting electrical contact between the contacts of the module connector and the contacts of the mounted connector. A cam on the connector block has two complementarily inclined ramp sections. When the module, guided by the guide rail, is moved into initial engagement with the cam, the first ramp lifts the module, including the electrical contacts of its connector, above the connector block of the mounted connector. When the module is moved further into engagement with the cam, the second ramp lowers the module connector onto the connector block, with the contacts of the module connector lowering onto and making contact with the contacts of the mounted connector. The camming motion minimizes wiping between the mating contacts. In addition, the contacts of the mounted connector are preferably somewhat resiliently deflectable to promote good electrical contact.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 2 is a perspective view of the transceiver module, partially cut away to show the transceiver circuitry, illustrating the transceiver module mating with an optical cable;

FIG. 3 is a perspective view of the connector block portion of the camming connector;

DESCRIPTION OF PREFERRED EMBODIMENTS

Figure 1:
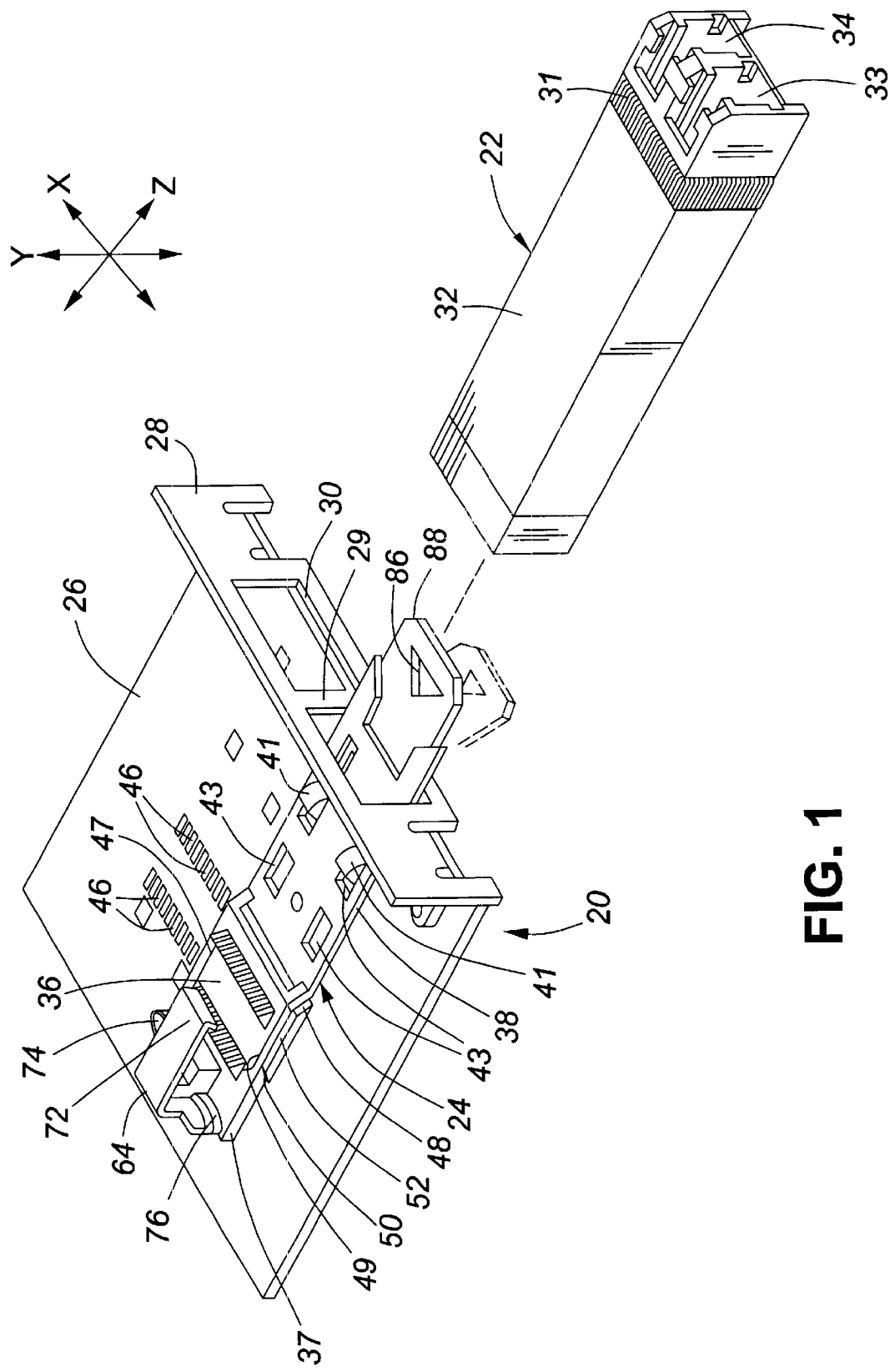
FIG. 1 is a perspective view of the connector system, showing an electronic assembly having a camming connector mateable with a transceiver module.

As illustrated in FIG. 1, a peripheral device port assembly 20 of a personal computer or similar device (not shown) is electrically and mechanically mateable with a data transceiver module 22. Transceiver module 22 is preferably a SFF version of the GBIC or SOC type and, as illustrated in FIG. 2, includes suitable optical transceiver electronics, such as a laser photodiode-based transmitter 21, a photodetector-based receiver 23, and suitable integrated circuit chips 25 that contain laser driver preamplifiers and other circuitry of the type conventionally included in optoelectronic transceivers. Module 22 receives and transmits serial optical data and serial electrical data, although parallel optical and/or parallel electrical transmission and reception is also contemplated within the realm of this invention. Module 22 communicates electrical signals to and from peripheral device port assembly 20 using the electrical connector system described below.

Assembly 20 includes a camming electrical connector 24 surface mounted as described in further detail below on a printed circuit board 26. A spring clip 64 is also surface-mounted on circuit board 26. Assembly 20 also includes a bracket or bezel 28 mounted perpendicularly to circuit board 26. Bezel 28 has a rectangular opening 30 with substantially industry-standard dimensions and is capable of receiving transceiver module 22 having the PCMCIA standard height of 9.8 mm (maximum). Preferably, the dimensions are 14.3 mm by 10.2 mm. In use, assembly 20 can be mounted in an orientation with bezel 28 parallel to and abutting a wall of a computer enclosure having a correspondingly dimensioned opening. Because the novel connector system of the present invention is mateable through an enclosure opening 30 having standard PCMCIA dimensions and a septum 29, connector 24 of the system can be mounted on an essentially standard peripheral device port assembly 20. In other words, computer device manufacturers can readily adapt their existing assemblies of this type to include the novel connector system of the present invention in place of conventional connector systems, such as those that use D-shell connectors.

A particular advantage of the connector system of the present invention is that module 22 can conform to the SFF standard. In accordance with the SFF standard, module 22 preferably has an enclosure 32 that is less than 9.8 mm in height and 13.5 mm in width. As used in this patent specification, the term "width" refers to the dimension or axis labeled "X" in FIG. 1, and the term "height" refers to the dimension or axis labeled "Y" in FIG. 1. In view of the increasing desire in the industry to miniaturize communication transceivers in order to increase port density, it has been suggested that newer transceivers that conform to the SFF standard have connectors that resemble a standard RJ-45 telephone jack, which is less than 13.5 mm wide. Module 22 has optical input and output connectors 33 and 34 that, as illustrated in FIG. 2, are optically and mechanically mateable with an optical cable connector assembly 35. Module 22 thus receives serial optical signals at one end from optical cable connector assembly 35, converts them to electrical signals, and provides the electrical signals at the other end to assembly 20. Likewise, module 22 receives serial electrical signals at one end from assembly 20, converts them to optical signals, and provides the optical signals at the other end to optical cable connector assembly 35. Although FIGS. 1 and 2 illustrate a LC SFF optical connector, other SFF optical connectors such as the MT-RJ or VF-45 can alternatively be used.

Figure 4:
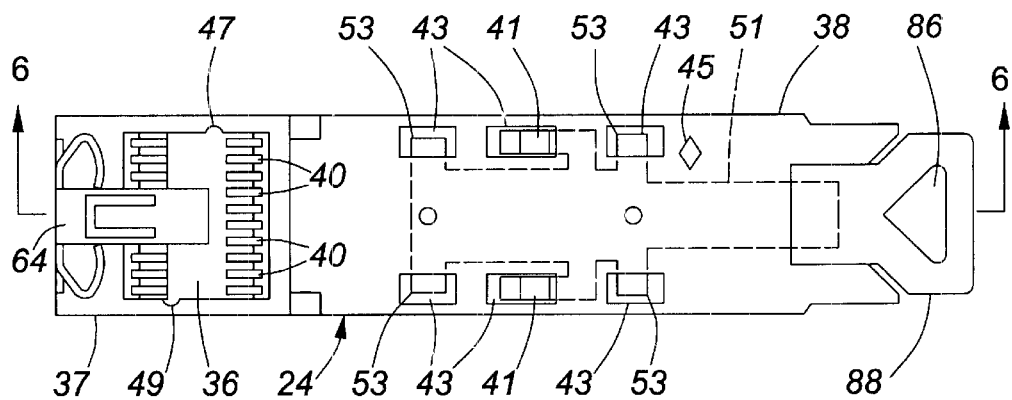
FIG. 4 is a top plan view of the camming connector.
Figure 5:
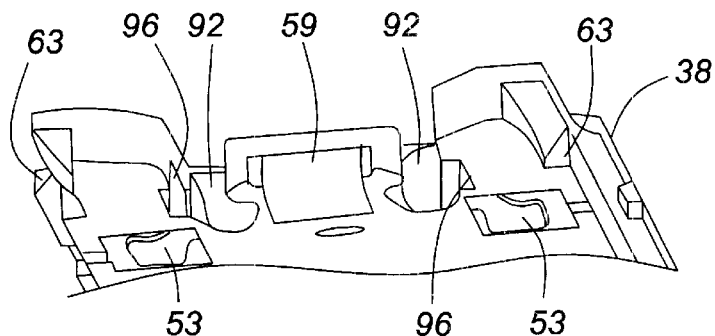
FIG. 5 is a perspective view of the distal end of the camming connector, with the latch member removed to show the engagement mechanism.
Figure 6:
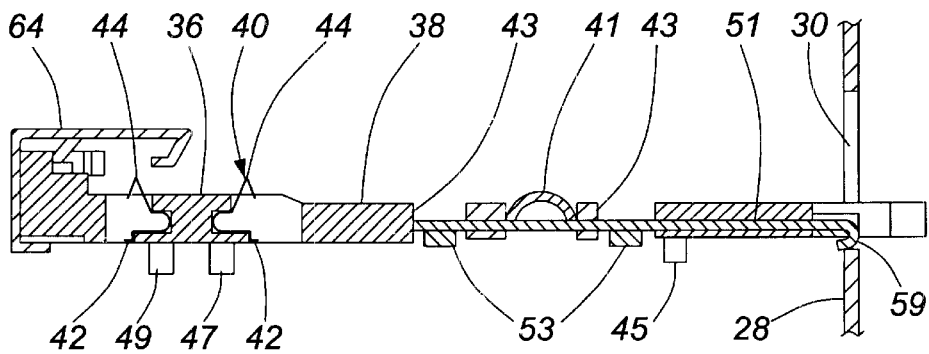
FIG. 6 is a sectional view of the camming connector taken on line 6—6 of FIG. 4.

With further reference to FIGS. 4–6, connector 24 includes a connector block 36 and an elongated, flat or tongue-shaped guide rail 38. Connector 24 may comprise any suitable number of parts. Preferably, connector block 36 is a separate part, illustrated in FIG. 3, that fits within a rectangular opening in a camming block 37 at one end of guide rail 38. Connector block 36, camming block 37 and guide rail 38 are preferably made of plastic. Connector block 36 has two pins 47 and 49 that extend from its lower surface to facilitate mounting it to circuit board 26. Guide rail 38 has a diamond-shaped pin 45 that serves the same purpose. Guide rail 38 is elongated in the dimension or axis labeled "Z" in FIG. 1. Connector 24, including connector block 36 and guide rail 38, is preferably no wider than about 12 mm. This miniaturization allows two or more such connectors 24 to be mounted side-by-side in a standard PCMCIA-width opening 30 to increase port density.

Two (or more in other embodiments) rows of electrical contacts 40 oriented in the X direction are mounted in connector block 36. Electrical contacts 40 are of the conventional J-lead type. That is, each contact 40 is a wire-like or strip-like member having a surface-mountable lower portion 42 connected via a generally U-shaped or J-shaped bend to an upper portion 44 that is somewhat resiliently deflectable with respect to lower portion 42. Lower portion 42 of each contact 40 is essentially flush with the lower surface of connector block 36, protruding only slightly to facilitate surface-mounting and soldering to pads 46 of circuit board 26. Circuit board 26 may comprise any suitable type of rigid or flexible printed circuit substrate, and conventional solder reflow processes can be used to surface-mount contacts 40. Upper portion 44 of each contact 40 protrudes slightly from the upper surface of connector block 36 to facilitate electrical contact, as described below. The upper surface of connector block 36 is substantially planar, and the plane defined by upper portions 44 collectively is substantially parallel to the lower surface of connector block 36. The upper and lower surfaces of connector block 36 and guide rail 38 are all mutually parallel and, when connector 24 is mounted on circuit board 26, are parallel to circuit board 26 as well.

As illustrated in FIGS. 1 and 4–6, electrical coupling between connector 24 and surface-mount pads of circuit board 26 is achieved through, in addition to contacts 40, a sheet-metal-grounding strip 51 that is encapsulated or molded within guide rail 38. Grounding strip 51 is bent such that two upper contact portions 41 protrude through two of the apertures 43 in guide rail 38, and extend a sufficient distance above the upper surface of guide rail 38 to resiliently contact a conductive bottom cover 39 on the underside of module 22 (see FIG. 7) that is electrically coupled to the ground potential of module 22. Likewise, grounding strip 51 is bent such that four lower contact portions 53 protrude through four other apertures 43 sufficiently to surface-mount them to pads on circuit board 26 on which a signal at ground potential would exist during operation of the system. A further contact portion 59 exists where grounding strip 51 emerges from the distal end of guide rail 38. As illustrated in FIG. 6, contact portion 59 makes contact with the portion of bezel 28 that bounds opening 30. The resulting electrical path enhances shielding against electromagnetic interference (EMI). Note that when module 22 extends through opening 30, the top wall and one or both sidewalls of its enclosure 32 make mechanical and electrical contact with the walls of opening 30, effectively sealing those gaps against EMI. Note that the sidewalls preferably have an EMI spring gasket 31 to promote such sealing. Because, as described in further detail below, enclosure 32 of module 22 preferably has a "U" shape, i.e., no bottom wall, the mechanical and electrical contact between contact portion 59 and bezel 28 provides an EMI seal for the bottom gap as well. Although the contemplated purposes of contact portions 41, 53 and 59 are grounding and EMI shielding, in other embodiments of the invention such secondary contacts may be used for communication of other types of signals.

Connector 24 has a cam defined by two oppositely inclined ramps 48 and 50, having lower ends substantially level with the lower surface of connector 24 and upper ends coupled together via a flat region 52, i.e., a portion parallel to the upper and lower surfaces of connector 24. Ramps 48 and 50 may each be inclined at any suitable acute angle with respect to these surfaces, and the angles can be complementary or entirely different. Connector block 36 has indented portions shaped correspondingly to ramps 48 and 50 and region 52. In view of the corresponding ramp and indentation features, the cam can be described another way as having a groove with two portions inclined at generally opposing or complementary angles connected by a flat portion. Although in the illustrated embodiment of the invention the camming element is a cam having the above-described structure, other embodiments may have alternative cam mechanisms or other suitable types of camming elements.

Figure 7:
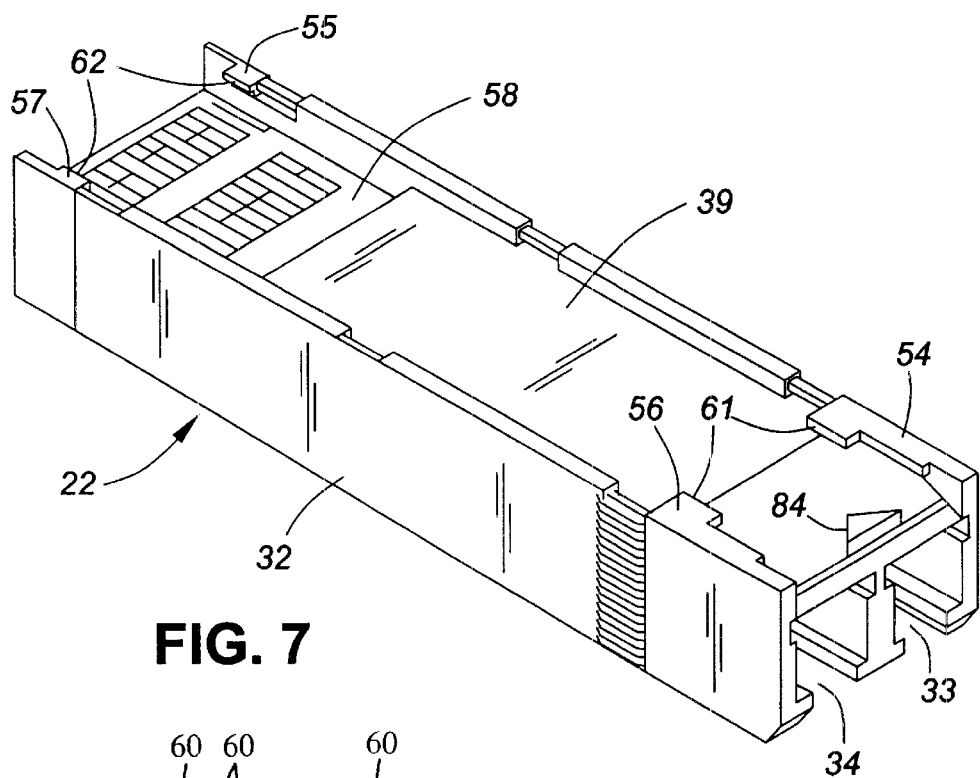
FIG. 7 is a perspective view showing the bottom of the transceiver module.

To use the connector system, a user engages the forward end of module 22 on guide rail 38. As illustrated in FIG. 7, flanges 54, 55, 56 and 57 on the lower edges of the side walls of enclosure 32 define channels in which guide rail 38 fits closely and can be slid. Thus, module 22 is guided by guide rail 38 as the user continues to slide module 22 in the direction of connector block 24, i.e., in the Z direction. In this orientation, flanges 54–57 are substantially parallel to circuit board 26.

Figure 8:
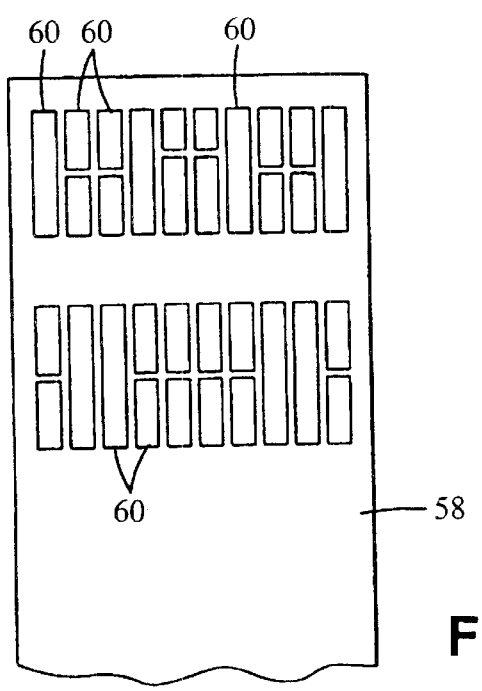
FIG. 8 is a top plan view of the contact pads of the transceiver module circuit board.

As illustrated in FIGS. 9A–9E, illustrating this mating action, module 22 has an internal circuit board 58 that is substantially parallel to edges 54 and 56. As illustrated in FIG. 8, the lower surface of circuit board 58 has electrical contact pads 60. Contact pads 60 are arranged in a complementary manner with respect to contacts 40 in connector block 36. In other words, the position of each contact pad 60 on circuit board 58 mirrors the position of a contact 40 in connector block 36. Contact pads 60 are preferably of different lengths to provide a signal connection sequencing function when electrical contact is made. When the forward end of module 22 reaches connector block 36, the cam-follower projections 62 of flanges 55 and 57 travel in or follow the cam groove. Initially, they engage the lower ends of ramps 48. Ramps 48 redirect to the Y direction a portion of the force they experience in the Z direction. Projections 62 thus ride up ramps 48 (i.e., partially in the Y direction and partially in the Z direction), lifting forward end of module 22 and with it circuit board 58. When projections 62 reach the upper ends of ramps 48 in response to continued force applied by the user in the Z direction, they move onto flat regions 52. When projections 62 reach the other end of flat regions 52, they ride down ramps 50 in a similar manner (i.e., partially in the Y direction and partially in the Z direction). The groove walls that are complementary to ramps 50 redirect to the Y direction a portion of the force they experience in the Z direction. As projections 62 move downwardly, circuit board 58 descends toward the upper surface of connector block 36. As circuit board 58 descends, contact pads 60 of circuit board 58 make contact with upper portions 44 of contacts 40, deflecting them slightly in the Y direction.

Figure 9A:
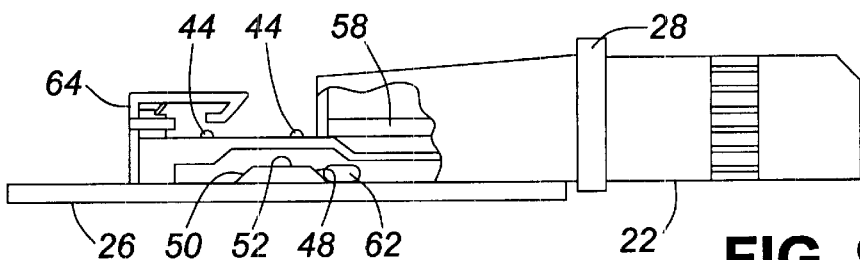
FIG. 9A illustrates the beginning of the mating action between the camming connector and the transceiver module.
Figure 9B:
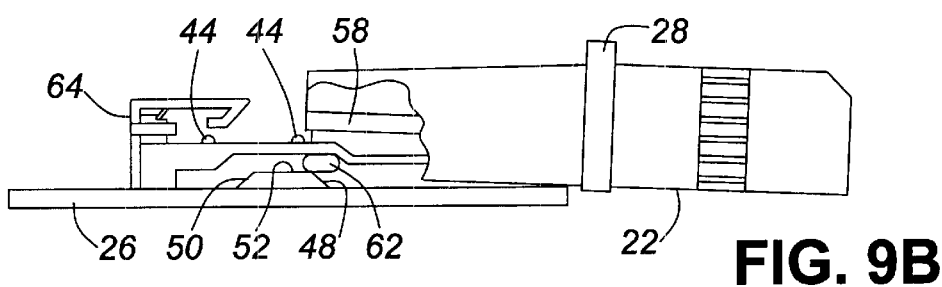
FIG. 9B is similar to FIG. 9A and illustrates further progression in the mating action.
Figure 9C:
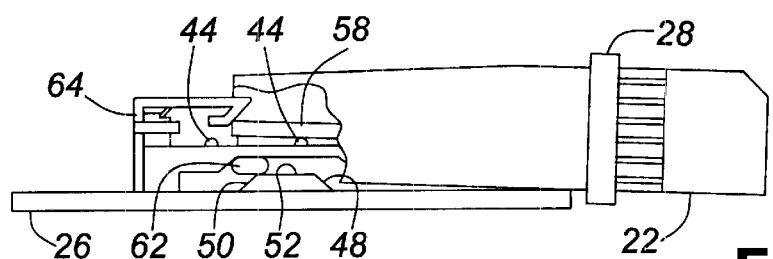
FIG. 9C is similar to FIGS. 9A–B and illustrates still further progression in the mating action.
Figure 9D:
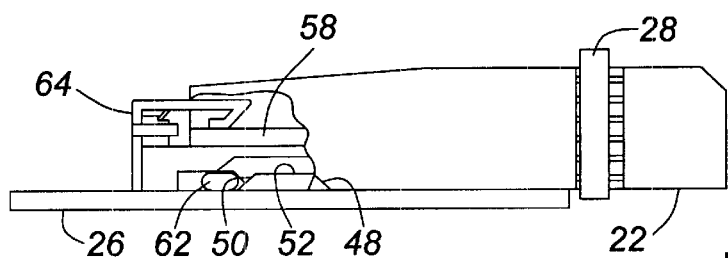
FIG. 9D is similar to FIGS. 9A–C and illustrates yet further progression in the mating action.
Figure 9E:
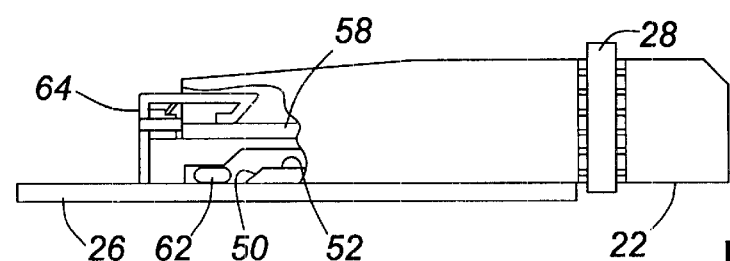
FIG. 9E is similar to FIGS. 9A–D and illustrates the end of the mating action, with the contacts fully mated.
Figure 10:
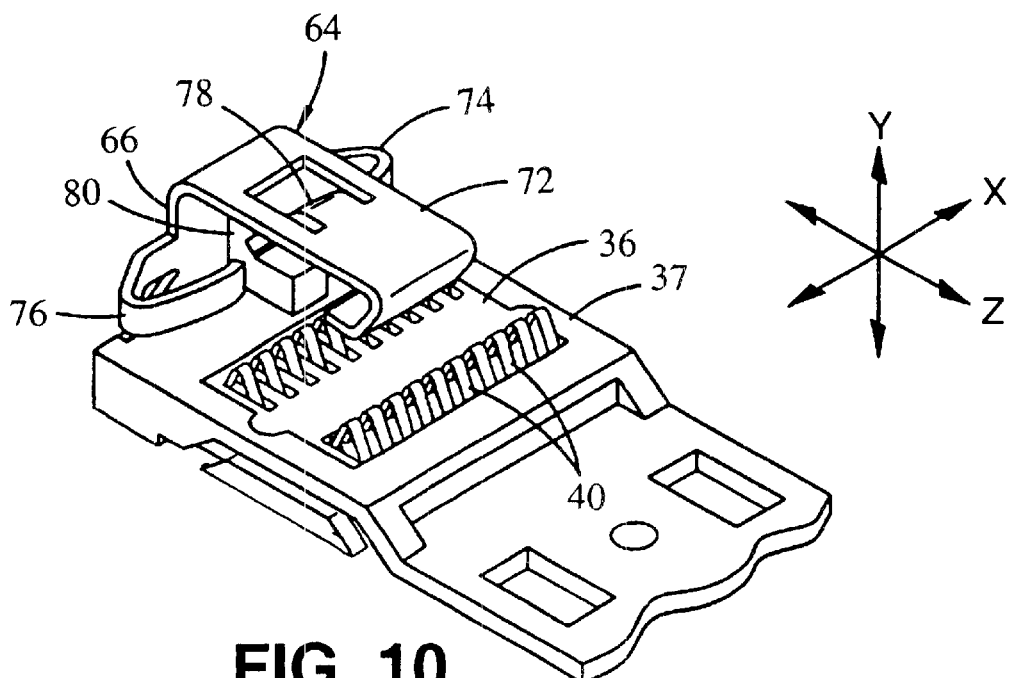
FIG. 10 is a partial perspective view of the camming connector, showing the spring clip.
Figure 11:
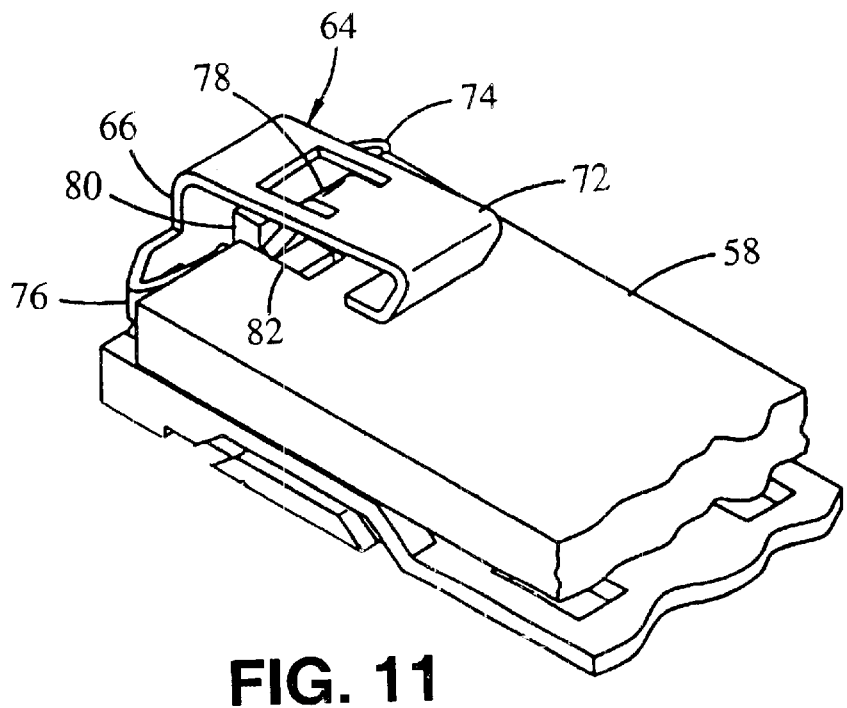
FIG. 11 is a perspective view similar to FIG. 10, showing the mating action between the camming connector and the circuit board portion of the transceiver module.
Figure 12:
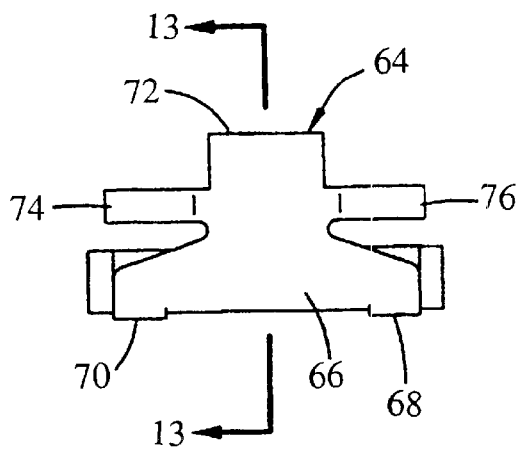
FIG. 12 is an end view of the camming connector, showing the spring clip.
Figure 13:
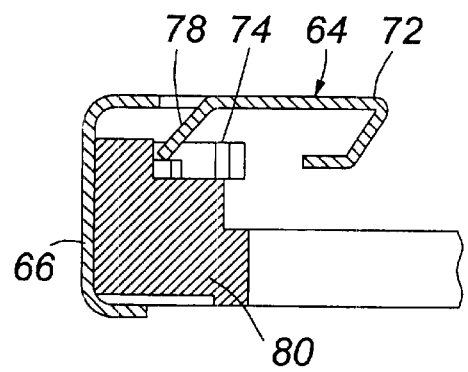
FIG. 13 is a sectional view taken on line 13—13 of FIG. 12.
Figure 14:
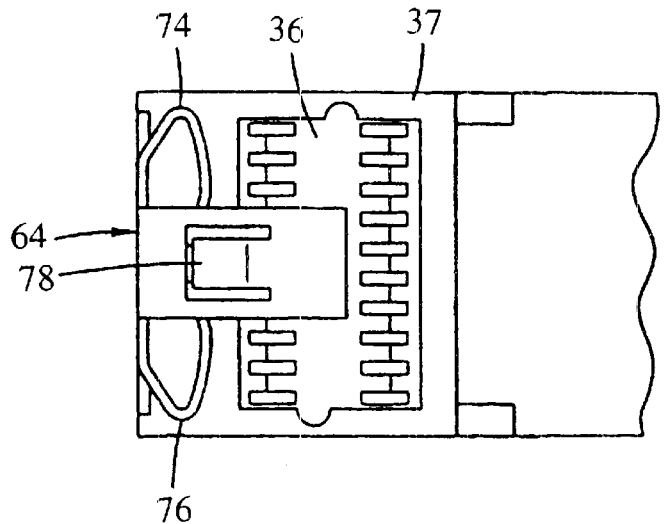
FIG. 14 is a top plan view of a portion of the camming connector.
Figure 15:
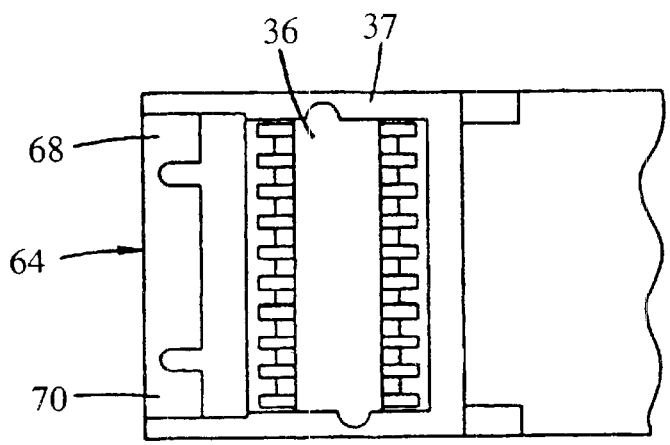
FIG. 15 is a bottom plan view of a portion of the camming connector.

Also, as best illustrated in FIGS. 9E, 10 and 11, as module 22 nears the end of its travel, spring clip 64 engages the upper surface of circuit board 58 and also makes contact with a grounding contact pad (not shown) thereon. Spring clip 64 is deflected slightly by circuit board 58, and resiliently biases circuit board 58 downwardly to further mechanically secure module 22 to connector 24 while providing an additional path for coupling module 22 to the ground potential of assembly 20.

As module 22 nears the end of its travel, flanges 54 and 56 engage the edges of guide rail 38. This late-engagement feature secures the optical coupling end of module 22 to guide rail 38 to complement the securing action of the camming mechanism at the electrical coupling end. Securing module 22 at both ends in this manner promotes good electrical contact between its conductive bottom cover 39 and upper contact portions 41 of grounding strip 51. Inward extensions 61 on flanges 54 and 56 define over-travel stops that prevent module 22 from being inserted too far into assembly 20 by abutting against corresponding stop members 63 (FIG. 5) on guide rail 38. That is, stop members 63 allow flanges 55 and 57 to pass but not flanges 54 and 56, which extend inward toward the center of module 22 further than flanges 55 and 57.

Spring clip 64 provides a combined lock-down and kick-out force. As illustrated in FIGS. 10–15, spring clip 64 is a unitary piece of spring steel or other suitable material that is bent into the following portions: Spring clip 64 has a planar base portion 66 abutting the end of the camming block 37. Base portion 66 is preferably aligned with a plane defined by the X–Y axes, i.e., normal to the Z axis, but precision in this alignment is not critical. Spring clip 64 also has two tabs 68 and 70 that extend from the lower area of base portion 124 in the direction of the Z axis along the underside of camming block 37. Tabs 68 and 70 can be surface-mounted to printed circuit board 26 to provide grounding. Extending from the upper area of base portion 66 in the general direction of the Z axis is a lock-down member 72. The distal end of lock-down member 72 is J-shaped or blunted to ease contact with module 22 during connection. In a particularly advantageous embodiment of the invention, in which spring clip 64 is made of spring steel 0.409 mm in thickness, lock-down member 72 provides a resilient bias force in the Y direction of approximately 15 newtons (N) at 0.68 mm deflection. Two generally U-shaped kick-out members 74 and 76 also extend from base portion 66. In an embodiment in which kick-out members 74 and 76 are oriented at this angle and spring clip 64 is made of spring steel 0.409 mm thickness, kick-out members 74 and 76 provide a resilient bias force in the Z direction of approximately 20 N at 0.45 mm deflection.

A barb 78 is formed in a portion of lock-down member 72 that has been cut in a U-shape by bending the portion within the cut downwardly. Camming block 37 as a step-shaped alignment block 80 on its upper surface. (See FIG. 13.) The distal end of barb 78 abuts the step to brace spring clip 64 against twisting or bending backwards in response to the force along the Z axis that spring clip 64 experiences when module 22 is mated, i.e., plugged in. Circuit board 58 of module 22 has an opening or slot 82 into which alignment block 80 moves as module 22 nears the end of its travel. Alignment block 80 fits closely within slot 82, thereby aligning circuit board 58 and its module 22 with connector block 37. Importantly, this alignment occurs before the contact pads 60 of circuit board 58 make contact with contacts 40. Thus, pads 60 are aligned with contacts 40 at the time contact is made. This precision alignment mechanism and alignment-before-contact sequencing allows the contact density to be quite high, which is desirable in many embodiments of the invention.

To further secure module 22 to connector 24 when electrical contact is made, the connector system includes a latch. A portion of the latch is included in module 22, and a mating portion is included in connector 24. Module 22 has a triangular tab 84 (FIG. 7) that snaps into a triangular opening 86 in a tongue-like latch member 88 at the distal end of guide rail 38 in response to relative movement in the Z direction.

To release the latch, the user depresses latch member 88 and disengages it from tab 84. Latch member 88 is preferably somewhat resilient, and bends in response to the user depressing it slightly. The user can then slide module 22 on guide rail 38 away from assembly 20. The mating parts disengage and electrical contact is broken in the reverse manner from that described above. When the latch is engaged, module 22 is retained in the position illustrated in FIG. 11. The then-deflected kick-out members 74 and 76 store potential energy in the resilient manner of a spring. When the latch is released, the deflected kick-out members 74 and 76 release their energy in the form of a force sufficient to eject or kick module 22 out slightly.

Figure 16:
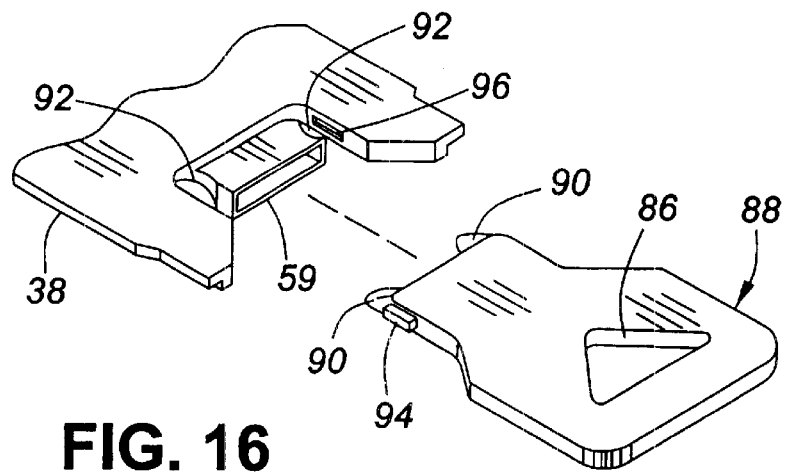
FIG. 16 is a perspective view, showing the removable engagement between the latch member and the guide rail.
Figure 17:
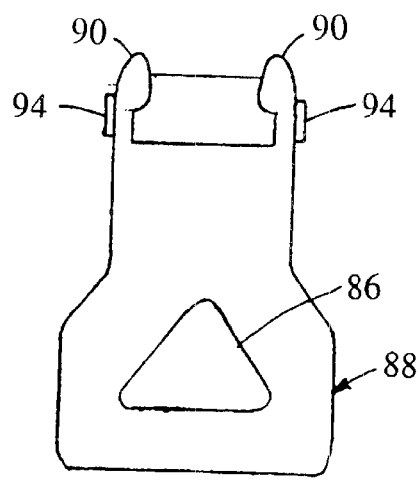
FIG. 17 is a bottom plan view of the latch member.
Figure 18:
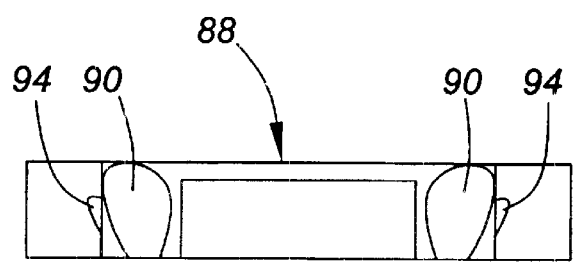
FIG. 18 is an end view of the latch member.

An important feature of the invention is that latch member 88 snaps free from its engagement with the distal end of guide rail 38 if it is inadvertently bumped or jarred with sufficient force, as indicated in dashed line in FIG. 1. This removability of latch member 88 decreases the likelihood of such a force damaging it or other parts. As illustrated in FIGS. 16–18, the nose or forward end of latch member 88 has two projections 90. The forward curved area of each projection 90 is somewhat frusto-conical, tapering to a blunt point with a flat bottom (FIG. 17), giving rise to a somewhat hoof-shaped or shoe-shaped appearance. Projections 90 mate with correspondingly-shaped recesses 92 in the distal end of guide rail 38. On each side of latch member 88 is a generally elongated or bar-shaped or snap projection 94. Snap projections 94 mate with correspondingly-shaped recesses 96 in the inside walls of the U-shaped slot that receives the projecting portion of latch member 88. To engage latch member 88 with guide rail 38, such as one may do if latch member 88 is jarred free or to initially assemble the connector, one angles projections 90 downwardly into their mating recesses 92 and then pivots latch member 88 into alignment with guide rail 38 until snap projections 94 snap into recesses 96. Note that the lower sides of snap projections 94 are tapered or inclined in a wedge-like manner to facilitate this snap engagement. Once engaged in this manner, latch member 88 is not easily dislodged or removed. Nevertheless, if it is struck or jarred with sufficient force, snap projections 94 will dislodge from recesses 96, allowing latch member 88 to break free, undamaged.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. An electrical connector, comprising:

a guide member elongated between first and second ends along a first axis;

a connector block at said first end of said guide member, said connector block having a width oriented along a second axis perpendicular to said first axis;

a plurality of electrical contacts retained in said connector block; and a connector latch member removably engageable with said second end of said guide member, said connector latch member disengageable from said guide member in response to a force experienced by said connector latch member;

wherein one of said connector latch member and said guide member has snap projection means elongated along said first axis, and the other has a snap recess means mateable with said snap projection means; and wherein said snap projection means snaps into said snap recess means to define a snap engagement.

2. The electrical connector claimed in claim 1, wherein said connector latch member has a flat, tongue-like shape and an opening mateable with a correspondingly shaped module latch member of a transceiver module.

3. The electrical connector claimed in claim 1, wherein:
said guide member has a slot in its distal end with opposing sidewalls, and each sidewall of said guide member has one of a snap recess or a snap projection; and
said connector latch member has a tab portion with opposing sidewalls that extends into said slot when said guide member and said latch member are engaged with one another, and each sidewall of said connector latch member has the other of a snap recess or a snap projection.

4. The electrical connector claimed in claim 3, wherein each of said guide member and said connector latch member has a flat, tongue-like shape.

5. The electrical connector claimed in claim 3, wherein said guide member includes a protuberance extending into said slot, each side wall of said protuberance having one of a recess or a projection; and wherein said connector latch member includes a recess for receiving the protuberance, each side wall of said recess having the other of a recess or a projection.

6. The electrical connector claimed in claim 1, wherein one of said connector latch member and said guide member has a generally wedge-shaped projection extending in the direction of said first axis into a recess in the other when said connector latch member and said guide member are engaged with one another.

7. The electrical connector claimed in claim 6, wherein said connector latch member has two wedge-shaped projections.

8. The electrical connector claimed in claim 1, wherein:
said connector block has an upper surface and a lower surface oriented in opposed relation along a third axis perpendicular to said first and second axes, and each electrical contact has an upper portion at said upper surface of said connector block for mating with a mating electrical connector and a lower portion at said lower surface of said connector block for surface-mounting to contact pads of a printed circuit card; and
said connector block has a camming element that, in response to a force experienced by said camming element along said first axis, redirects said force in a direction having a component along said third axis and toward said lower surface.

9. A computer system, comprising:
a computer enclosure;
a circuit board mounted within said computer enclosure; and
an electrical connector, comprising:
a guide member elongated between first and second ends along a first axis and having a width oriented along a second axis perpendicular to said first axis, said guide member extending through an opening in said computer enclosure;
a connector block at said first end of said guide member having an upper surface and a lower surface oriented in opposed relation;
a plurality of electrical contacts retained in said connector block, each electrical contact having an upper portion at said upper surface of said connector block for mating with a mating electrical connector and a lower portion at said lower surface of said connector block surface-mounted to contact pads of said printed circuit board; and
a connector latch member removably engageable with said second end of said guide member, said connector latch member disengageable from said guide member in response to a force experienced by said connector latch member outside of said computer enclosure;
wherein one of said connector latch member and said guide member has snap projection means elongated along said first axis, and the other has a snap recess means mateable with said snap projection means; and
wherein said snap projection means snaps into said snap recess means to define a snap engagement.

10. The computer system claimed in claim 9, wherein:
said computer enclosure has a bezel made of an electrically conductive material;
said guide member extends through an opening in said bezel, and a portion of said guide member makes electrical contact with said bezel.

11. The computer system claimed in claim 10, wherein said portion of said guide member that makes electrical contact with said bezel is a metal strip extending along said guide member and having an end at said distal end of said guide member in electrical contact with said bezel.

12. The computer system claimed in claim 9, wherein said connector latch member has a flat, tongue-like shape and an opening mateable with a correspondingly shaped module latch member of a transceiver module.

13. The computer system claimed in claim 9, wherein:
said guide member has a slot in its distal end with opposing sidewalls, and each sidewall of said guide member has one of a snap recess or a snap projection; and
said connector latch member has a tab portion with opposing sidewalls that extends into said slot when said guide member and said connector latch member are engaged with one another, and each sidewall of said connector latch member has the other of a snap recess or a snap projection.

14. The computer system claimed in claim 13, wherein each of said guide member and said connector latch member has a flat, tongue-like shape.

15. The computer system claimed in claim 13, wherein said guide member includes a protuberance extending into said slot, each side wall of said protuberance having one of a recess or a projection; and wherein said connector latch member includes a recess for receiving the protuberance, each side wall of said recess having the other of a recess or a projection.

16. The computer system claimed in claim 9, wherein one of said connector latch member and said guide member has a generally wedge-shaped projection extending in the direction of said first axis into a recess in the other when said connector latch member and said guide member are engaged with one another.

17. The computer system claimed in claim 16, wherein said latch member has two wedge-shaped projections.

18. The computer system claimed in claim 9, wherein:
said electrical connector has an upper surface and a lower surface oriented in opposed relation along a third axis perpendicular to said first and second axes, and each electrical contact has an upper portion at said upper surface of said electrical connector for mating with a mating electrical connector and a lower portion at said lower surface of said connector for surface-mounting to contact pads of a printed circuit card; and said connector block has a camming element that, in response to a force experienced by said camming element along said first axis, redirects said force in a direction having a component along said third axis and toward said lower surface.

19. A connector system, comprising:
a first electrical connector, comprising:
   a guide member elongated between first and second ends along a first axis;
   a connector block at said first end of said guide member;
   a plurality of electrical contacts retained in said connector block; and
   a connector latch member removably engageable with said second end of said guide member, said connector latch member disengageable from said guide member in response to a force experienced by said connector latch member;
wherein one of said connector latch member and said guide member has snap projection means elongated along said first axis, and the other has a snap recess means mateable with said snap projection means; and
wherein said snap projection means snaps into said snap recess means to define a snap engagement; and
a module, comprising:
   a body slideably engageable with said guide member of said first electrical connector in a direction along said first axis; and
   a plurality of electrical contacts mateable with said plurality of electrical contacts of said first electrical connector.

20. The connector system claimed in claim 19, wherein said module is an optoelectronic transceiver module.

21. The connector system claimed in claim 20, wherein a portion of said body is made of a conductive material.

22. The connector system claimed in claim 21, wherein said portion of said body has an electromagnetic interference (EMI) spring gasket.

23. The connector system claimed in claim 19, wherein said connector latch member has a flat, tongue-like shape and an opening mateable with a correspondingly shaped module latch member of a transceiver module.

24. The connector system claimed in claim 19, wherein:
said guide member has a slot in its distal end with opposing sidewalls, and each sidewall of said guide member has a snap recess; and
said connector latch member has a tab portion with opposing sidewalls that extends into said slot when said guide member and said latch member are engaged with one another, and each sidewall of said connector latch member has a snap recess.

25. The connector system claimed in claim 24, wherein each of said guide member and said connector latch member has a flat, tongue-like shape.

26. The connector system claimed in claim 24, wherein said guide member includes a protuberance extending into said slot, each side wall of said protuberance having one of a recess or a projection; and wherein said connector latch member includes a recess for receiving the protuberance, each side wall of said recess having the other of a recess or a projection.

27. The connector system claimed in claim 19, wherein one of said connector latch member and said guide member has a generally wedge-shaped projection extending in the direction of said first axis into a recess in the other when said connector latch member and said guide member are engaged with one another.

28. The connector system claimed in claim 27, wherein said latch member has two wedge-shaped projections.

29. The connector system claimed in claim 19, wherein:
said connector block has an upper surface and a lower surface oriented in opposed relation along a third axis perpendicular to said first and second axes, and each electrical contact has an upper portion at said upper surface of said connector block for mating with a mating electrical connector and a lower portion at said lower surface of said connector block for surface-mounting to contact pads of a printed circuit card; and
said connector block has a camming element that, in response to a force experienced by said camming element along said first axis, redirects said force in a direction having a component along said third axis and toward said lower surface.

30. The connector system claimed in claim 19, wherein said body of said module and edges of said guide member each have corresponding stops that abut one another to block further insertion of said module when said module is fully engaged with said connector.

31. The connector system claimed in claim 30, wherein:
each of said guide member and said connector latch member has a flat, tongue-like shape, and said body of said module slideably engages edges of said guide member; and
said guide member has a stop on at least one of said edges.

32. A computer system, comprising:
a computer enclosure having a bezel with an opening therein;
a circuit board mounted within said enclosure;
a first electrical connector, comprising:
   a guide member elongated between first and second ends along a first axis;
   a metal strip extending along said guide member and having a first electrical contact for connection with said circuit board, a second electrical contact for connection with said bezel, and a third electrical contact extending outwardly therefrom;
   a connector block at said first end of said guide member, said connector block having a width oriented along a second axis perpendicular to said first axis; and
   a plurality of electrical contacts retained in said connector block; and
a module, comprising:
   a body insertable through said opening in said bezel and slideably engageable with said guide member of said first electrical connector in a direction along said first axis, a portion of said body being made of a conductive material for connection with the third electrical contact; and
   a plurality of electrical contacts mateable with said plurality of electrical contacts of said first electrical connector.

33. The connector system claimed in claim 32, wherein said module is an optoelectronic transceiver module.

34. The connector system claimed in claim 33, wherein said portion of said body includes an electromagnetic interference (EMI) spring gasket and makes contact with said bezel.

* * * * *